United States Patent
Imoto et al.

(10) Patent No.: US 8,931,754 B2
(45) Date of Patent: Jan. 13, 2015

(54) SAFETY VALVE AND ELECTROMAGNETIC VALVE

(75) Inventors: Yoshinori Imoto, Kariya (JP); Hiroaki Suzuki, Nagoya (JP); Kazushi Numazaki, Toyota (JP); Chihiro Uchimura, Toyota (JP); Akira Yamashita, Toyota (JP); Tsukuo Ishitoya, Toyota (JP); Noritaka Watanabe, Okazaki (JP)

(73) Assignees: Jtekt Corporation, Osaka-shi (JP); Toyooki Kogyo Co., Ltd., Okazaki-shi (JP)

( * ) Notice: Subject to any disclaimer, the term of this patent is extended or adjusted under 35 U.S.C. 154(b) by 570 days.

(21) Appl. No.: 13/251,700

(22) Filed: Oct. 3, 2011

(65) Prior Publication Data

US 2012/0080625 A1  Apr. 5, 2012

(30) Foreign Application Priority Data

Oct. 5, 2010  (JP) ................................. 2010-225641

(51) Int. Cl.
| | |
|---|---|
| F16K 31/02 | (2006.01) |
| F16K 17/02 | (2006.01) |
| F16K 27/02 | (2006.01) |
| F16K 17/164 | (2006.01) |
| F16K 31/06 | (2006.01) |

(52) U.S. Cl.
CPC ............... *F16K 27/029* (2013.01); *F16K 17/02* (2013.01); *F16K 17/164* (2013.01); *F16K 31/0686* (2013.01); *F16K 31/02* (2013.01); Y02E 60/321 (2013.01)
USPC ..................... 251/38; 137/115.2; 137/115.26; 137/67

(58) Field of Classification Search
CPC ................................. F16K 17/02; F16K 31/02
USPC ........ 137/115.18, 115.2, 115.26; 251/129.15, 251/38, 44
See application file for complete search history.

(56) References Cited

U.S. PATENT DOCUMENTS

| | | | | |
|---|---|---|---|---|
| 3,865,140 | A | * | 2/1975 | Greenwood ............. 137/625.64 |
| 5,129,620 | A | * | 7/1992 | Castetter ......................... 251/65 |
| 6,293,296 | B1 | * | 9/2001 | Konishi et al. ........... 137/115.13 |
| 2002/0148991 | A1 | * | 10/2002 | Herbert et al. .............. 251/30.02 |

(Continued)

FOREIGN PATENT DOCUMENTS

| | | |
|---|---|---|
| JP | A-59-197680 | 11/1984 |
| JP | A-8-180850 | 7/1996 |

(Continued)

OTHER PUBLICATIONS

Apr. 22, 2014 Notification of Reasons for Rejection issued in Japanese Patent Application No. 2010-225641 (with English-language translation).

*Primary Examiner* — John Rivell
*Assistant Examiner* — Christopher Ballman
(74) *Attorney, Agent, or Firm* — Oliff PLC

(57) ABSTRACT

A safety valve includes a cylinder having an open end and a plug for closing the open end with a hermetic seal. The interior of the cylinder communicates with a high-pressure gas passage. The cylinder is deformed as a function of gas pressure in the high-pressure gas passage to widen the open end. This allows gas in the high-pressure gas passage to escape and thus prevents the gas pressure from increasing beyond an acceptable level.

4 Claims, 7 Drawing Sheets

(56) References Cited

U.S. PATENT DOCUMENTS

| | | | |
|---|---|---|---|
| 2003/0234377 A1* | 12/2003 | Herbert et al. | 251/129.17 |
| 2007/0241298 A1* | 10/2007 | Herbert et al. | 251/129.04 |
| 2010/0051841 A1* | 3/2010 | Herbert et al. | 251/129.04 |
| 2011/0115587 A1* | 5/2011 | Ishibashi | 335/255 |
| 2012/0199775 A1* | 8/2012 | Watanabe | 251/129.15 |
| 2014/0145100 A1* | 5/2014 | Ishibashi et al. | 251/129.15 |

FOREIGN PATENT DOCUMENTS

| | | |
|---|---|---|
| JP | A-11-151160 | 6/1999 |
| JP | A-11-182722 | 7/1999 |
| JP | A-2003-240148 | 8/2003 |

* cited by examiner

SAFETY VALVE AND ELECTROMAGNETIC VALVE

CROSS-REFERENCE TO RELATED APPLICATION

This application is based on and claims priority from Japanese Patent Application No. 2010-225641 filed on Oct. 5, 2010, the entire contents of which are incorporated herein by reference.

BACKGROUND OF THE INVENTION

The present invention relates to a safety valve for preventing gas pressure from increasing beyond an acceptable level and to an electromagnetic valve that serves as the safety valve.

Conventionally, high-pressure gas supply systems such as gas tanks for fuel-cell cars have valve devices. An electromagnetic valve is known as one example of such a valve device and is used for controlling supply of hydrogen gas stored in the gas tank mounted on a fuel-cell car (for example, refer to Japanese Laid-Open Patent Publication No. 2003-240148). Such valve devices function, for example, as safety valves that prevent gas pressure from increasing beyond an acceptable level, that is, such valve devices prevent excessive pressure from being generated.

The internal pressure of the gas tank for a fuel-cell car, that is, the pressure of hydrogen gas stored in the gas tank, is as high as, for example, 70 MPa. Charging of hydrogen gas into a gas tank is performed, in some cases, by using a charging device that uses a pressure reducing valve for lowering a charging gas pressure, which is higher than the tank internal pressure and is, for example, approximately 200 MPa.

However, if the pressure reducing valve of the charging device malfunctions and the charging gas pressure is applied to the gas tank without being lowered, the internal pressure of the gas tank can be instantly increased beyond the acceptable level. In such a case, hydrogen gas in the gas tank (and in the high-pressure gas passage) is discharged to the outside by a safety valve. This prevents the gas pressure from increasing beyond the acceptable level.

Specific examples of such safety devices include those disclosed in Japanese Laid-Open Patent Publications No. 11-182722 and No. 59-197680, which disclose configurations using a breakable member such as a rupture disc. Such a disc is ruptured when the pressure in a high-pressure gas passage is increased, to discharge gas in the high-pressure gas passage to the outside. Also, as disclosed in Japanese Laid-Open Patent Publication No. 11-151160, a relief valve using spring force can be used as a safety valve for high-pressure gas.

However, the limit pressure, at which the breakable member is ruptured, that is, the rupture limit of the breakable member is difficult to control. Thus, reduction in costs through mass production of breakable members cannot be expected. Also, a relief valve that utilizes spring force has the drawback that it is larger in size than the breakable member. In addition, particularly in a hydrogen gas supply system, embrittlement of the spring can hamper the operation of the relief valve. Therefore, there is a demand for a simple, inexpensive and accurate safety valve.

SUMMARY OF THE INVENTION

Accordingly, it is an objective of the present invention to provide an accurate, simply structured and low-cost safety valve that prevents gas pressure from increasing beyond an acceptable level. Another objective is to provide an electromagnetic valve that functions as the safety valve.

To achieve the foregoing objective and in accordance with one aspect of the present invention, a safety valve is provided that includes a cylinder having an open end and a plug for closing the open end with a hermetic seal. The interior of the cylinder communicates with a high-pressure gas passage. The cylinder is deformed as a function of gas pressure in the high-pressure gas passage to widen the open end. This allows gas in the high-pressure gas passage to escape and thus prevents the gas pressure from increasing beyond an acceptable level.

The safety valve may further include a sealing member located between the plug and the open end. The sealing member is compressed between the plug and the open end to form the hermetic seal between the plug and the open end.

The safety valve may further include a restricting member that restricts the plug and the cylinder from moving relatively away from each other.

In accordance with another aspect of the present invention, an electromagnetic valve is provided that includes a cylindrical sleeve that is located in a high-pressure gas passage and has an open end. A plug closes the open end of the sleeve with a hermetic seal. An electromagnetic coil is located at a position radially outside of the sleeve. A plunger moves within the sleeve based on magnetomotive force of the electromagnetic coil. A valve body opens and closes the high-pressure gas passage based on movement of the plunger. The electromagnetic valve functions as a safety valve in which the sleeve is deformed as a function of gas pressure in the high-pressure gas passage to widen the open end. This allows gas in the high-pressure gas passage to escape and thus prevents the gas pressure from increasing beyond an acceptable level.

The sleeve of the electromagnetic valve may have a high rigidity portion that is harder to deform than the open end of the sleeve.

The electromagnetic valve may further include a sealing member located between the plug and the open end. The sealing member is compressed between the plug and the open end to form the hermetic seal between the plug and the open end.

A gap is formed at a position radially outside of the sleeve of the electromagnetic valve to permit the open end of the sleeve to be widened.

Other aspects and advantages of the invention will become apparent from the following description, taken in conjunction with the accompanying drawings, illustrating by way of example the principles of the invention.

DETAILED DESCRIPTION OF THE PREFERRED EMBODIMENTS

First Embodiment

A first embodiment of the present invention will now be described with reference to FIGS. 1 and 2.

Figure 1:
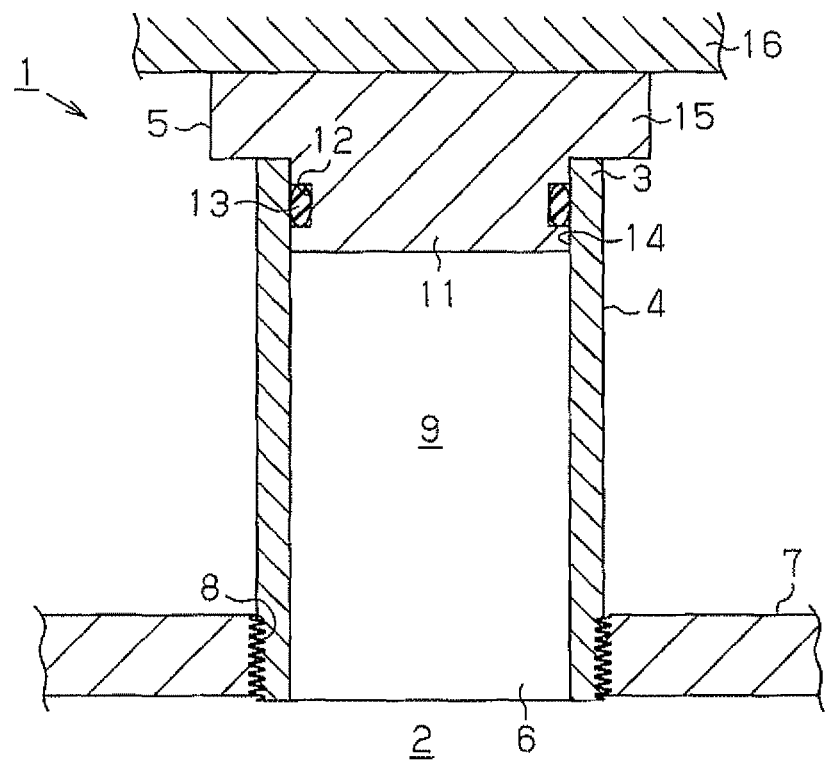
FIG. 1 is a cross-sectional view illustrating a safety valve according to a first embodiment of the present invention.

A safety valve 1 according to the present embodiment shown in FIG. 1 includes a cylinder 4 having a substantially circular cross section and a plug 5. The cylinder 4 has an open end 3, which is closed by the plug 5. The open end 3 is one of the axial ends of the cylinder 4 (the upper end as viewed in FIG. 1). The interior 9 of the cylinder 4 communicates with a high-pressure gas passage 2 defined by a pipe wall 7.

A connection hole 8 is formed in the pipe wall 7. The cylinder 4 has a connection end 6, which is an axial end of the cylinder 4 (the lower end as viewed in FIG. 1) that is opposite to the open end 3. The cylinder 4 is connected to the pipe wall 7 with the connection end 6 located in the connection hole 8 of the pipe wall 7. The connection end 6 of the cylinder 4 faces the high-pressure gas passage 2. In this embodiment, a thread is formed on the outer circumference of the connection end 6 of the cylinder 4 and on the connection hole 8 of the pipe wall 7, so that the connection end 6 can be screwed to the connection hole 8.

The plug 5 has a substantially columnar insertion portion 11, which is inserted into the open end 3 of the cylinder 4. The outer diameter of the insertion portion 11 is substantially equal to the inner diameter of the open end 3. An annular groove 12 is formed in the outer circumference of the insertion portion 11. An O-ring 13, which functions as a sealing member, is located in the annular groove 12. The O-ring 13 in the annular groove 12 contacts and is compressed by a part of the inner circumferential surface 14 of the open end 3 that faces the annular groove 12, to form a hermetic seal between the inner circumferential surface 14 of the open end 3 and the plug 5. That is, the open end 3 of the cylinder 4 is closed with a hermetic seal by the plug 5.

A restricting member 16 contacts a main body 15 of the plug 5, thereby preventing the plug 5 from moving (upward as viewed in FIG. 1) away from the cylinder 4 along the axial direction of the cylinder 4. That is, relative movement between the plug 5 and the cylinder 4 is restricted by the restricting member 16. Therefore, the cylinder 4 of the safety valve 1 according to the present embodiment is deformed such that the open end 3 is widened radially outward of the cylinder 4, or the diameter of the open end 3 is increased, as a function of gas pressure (the gas pressure of the interior 9 of the cylinder 4 and the gas pressure in the high-pressure gas passage 2).

Figure 2:
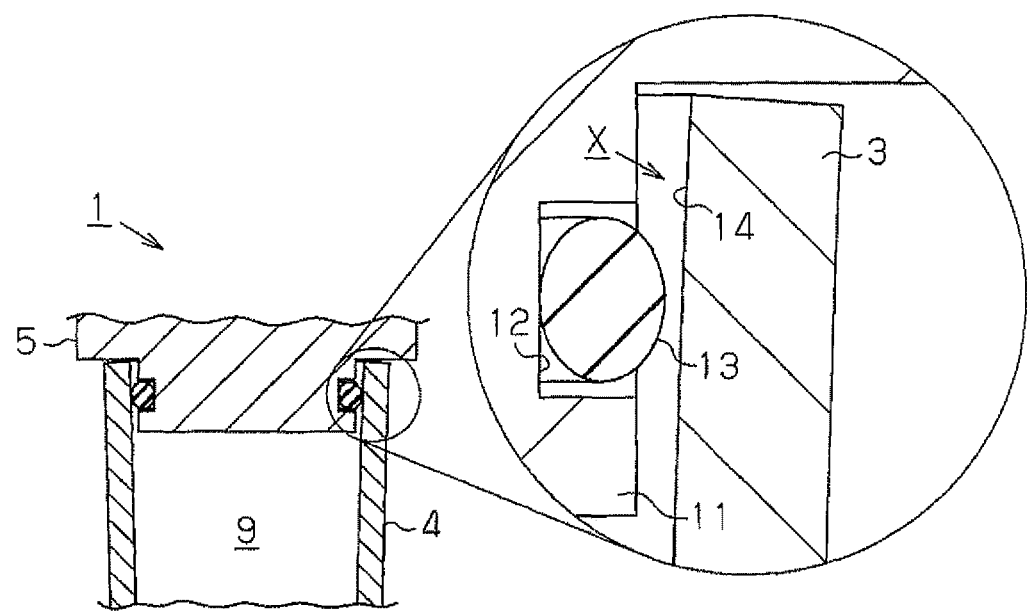
FIG. 2 is an operational diagram of the safety valve of FIG. 1.

When the open end 3 of the cylinder 4 is widened due to an increase in the gas pressure and a wide gap X is created between the inner circumferential surface 14 of the open end 3 and the insertion portion 11 of the plug 5 as shown in FIG. 2, the O-ring 13 is restored to its original state from its compressed state, and the hermetic seal created by the O-ring 13 is broken. As a result, gas escapes from the interior 9 of the cylinder 4 through the gap X, so that the gas pressure in the high-pressure gas passage 2 does not increase beyond the acceptable level.

The present embodiment has the following advantages.

The cylinder 4 of the safety valve 1 is deformed such that the open end 3 is widened as a function of gas pressure in the high-pressure gas passage 2. As a result, gas in the high-pressure gas passage 2 escapes through the gap between the inner circumferential surface 14 of the open end 3 of the cylinder 4 and the plug 5, so that the gas pressure does not increase beyond the acceptable level. The degree of deformation of the cylinder 4 as a function of the gas pressure, particularly, the extent of widening of the open end 3, is easily predicted with high accuracy based on the material and shape of the cylinder 4. Therefore, compared to a safety device that uses a breakable member such as a rupture disc, of which the rupture limit is difficult to control, the performance of the safety valve 1 can be easily made uniform, and the safety valve 1 can be manufactured at low costs. In addition, the safety valve 1 has a simpler structure and is thus smaller in size than a relief valve using spring force. Further, being free of embrittlement caused by hydrogen gas, the safety valve 1 operates reliably in the hydrogen gas supply system. Therefore, the safety valve 1 has a simple structure and is inexpensive and accurate.

Even when the gas pressure increases and the open end 3 of the cylinder 4 is widened accordingly, the O-ring 13 provided in the plug 5 continues sealing the gap between the circumferential surface 14 of the open end 3 and the plug 5 until the O-ring 13 completely returns to its original state from its compressed state. Such behavior of the O-ring 13 is used for controlling the pressure of gas that escapes to the outside from the interior 9 of the cylinder 4 through the gap between the inner circumferential surface 14 of the open end 3 and the plug 5. That is, the safety valve 1 easily performs pressure control with a simple structure and high accuracy. When the gas pressure in the high-pressure gas passage 2 is lowered after the escape of gas, the widened open end 3 returns to its original shape, so that the O-ring 13 is again compressed between the inner circumferential surface 14 of the open end 3 and the plug 5. Accordingly, the gap between the inner circumferential surface 14 of the open end 3 and the plug 5 is hermetically sealed again by the O-ring 13.

Since the plug 5 and the cylinder 4 are restricted from separating from each other by the restricting member 16, escape of gas from the interior 9 of the cylinder 4 due to such relative movement is prevented. Therefore, the gas pressure in the cylinder 4 and in the high-pressure gas passage 2 is controlled with high accuracy.

Second Embodiment

A second embodiment of the present invention will now be described with reference to FIGS. 3 to 5.

Figure 3:
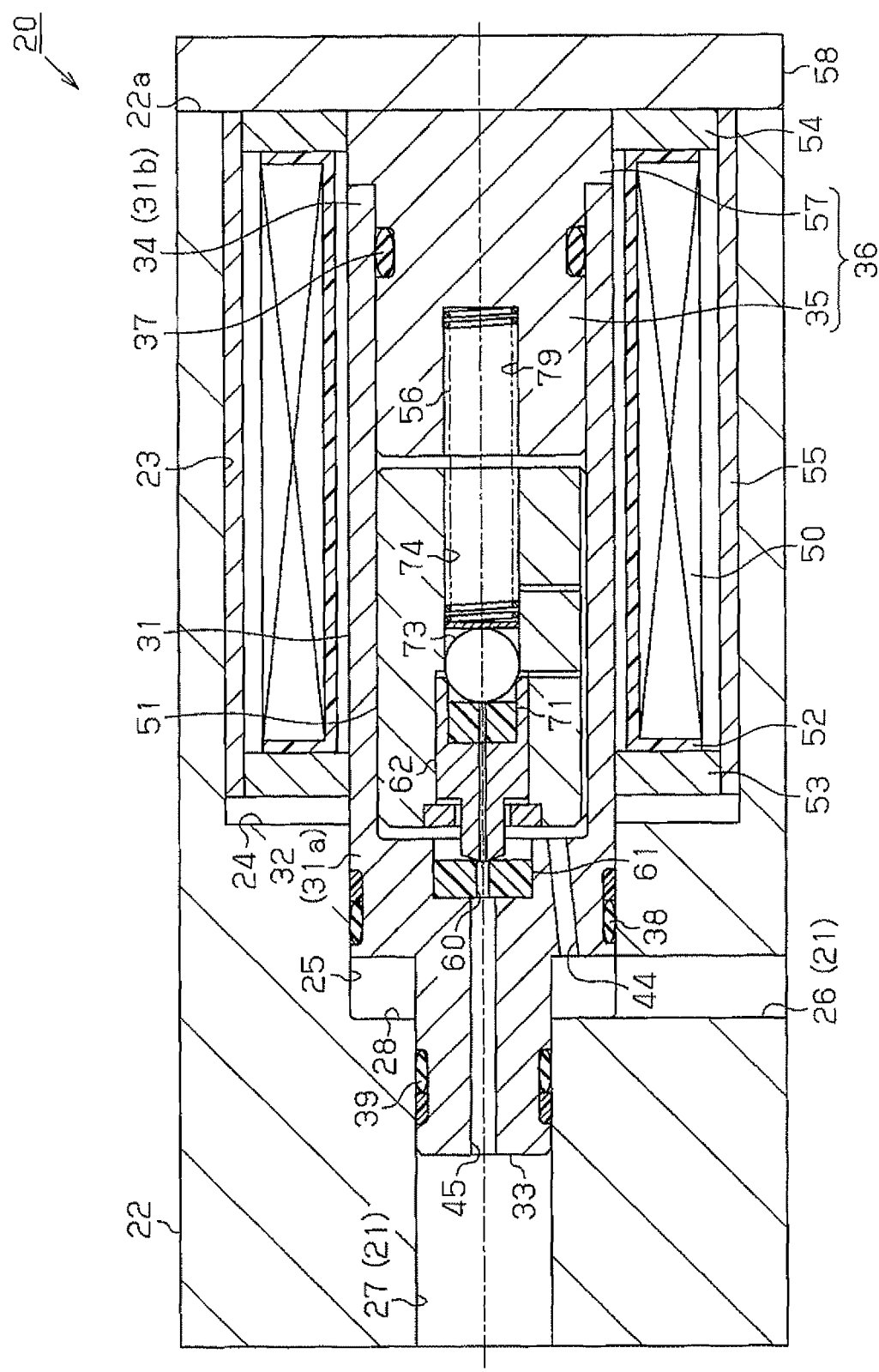
FIG. 3 is a cross-sectional view illustrating an electromagnetic valve according to a second embodiment of the present invention.

FIG. 3 shows an electromagnetic valve 20 of the present embodiment. The electromagnetic valve 20 is used in the high-pressure hydrogen gas supply system. The electromagnetic valve 20 is housed in a valve body 22. The valve body 22 is attached to a high-pressure hydrogen gas tank (not shown) to define a part of a high-pressure gas passage 21.

An accommodation hole 23 having a circular cross section is formed in one end 22a of the valve body 22 (right end as viewed in FIG. 3). An insertion hole 25, the diameter of which is smaller than the accommodation hole 23, is formed in the bottom surface 24 of the accommodation hole 23. The insertion hole 25 is coaxial with the accommodation hole 23. In the present embodiment, the insertion hole 25 also has a circular cross section. The valve body 22 has an inlet port 26, which communicates with the insertion hole 25, and an outlet port 27. The inlet port 26 receives inflow of hydrogen gas stored in the gas tank. The outlet port 27 discharges the hydrogen gas to a supply destination.

The inlet port 26 extends in a direction perpendicular to the axis of the insertion hole 25 (vertical direction in FIG. 3), and opens in the vicinity of the bottom surface 28 of the insertion hole 25. The outlet port 27 extends in a direction coaxial with the insertion hole 25 (lateral direction in FIG. 3), and opens in the center of the bottom surface 28 of the insertion hole 25.

The accommodation hole 23 and the insertion hole 25, which are coaxial and continuous with each other in the valve body 22, accommodate a substantially cylindrical sleeve 31 having a bottom 32. The inlet port 26 is connected to the outlet port 27 via the interior of the sleeve 31, so that the high-pressure gas passage 21 for delivering hydrogen gas from the gas tank to the supply destination is formed in the valve body 22.

The outer diameter of the sleeve 31 is substantially equal to the inner diameter of the insertion hole 25. A columnar protrusion 33 is formed on the bottom 32 of the sleeve 31. The protrusion 33 is coaxial with the sleeve 31 and extends along the axis of the sleeve 31. The outer diameter of the protrusion 33 is substantially equal to the inner diameter of the outlet port 27. When the sleeve 31 is accommodated in the accommodation hole 23 and the insertion hole 25, the bottom 32 of the sleeve 31 is arranged in the insertion hole 25, and the protrusion 33 of the sleeve 31 is arranged in the outlet port 27.

An end 31a of the sleeve 31 that is arranged in the insertion hole 25 (left end as viewed in FIG. 3) is closed by the bottom 32, while another end 31b of the sleeve 31 on the opposite side (right end as viewed in FIG. 3) is not closed but forms an open end 34. The open end 34 receives a stopper 36 having an insertion portion 35 located in the open end 34.

An O-ring 37, which functions as a sealing member, is located between the insertion portion 35 of the stopper 36 and the open end 34 of the sleeve 31. Another O-ring 38 is located between the insertion hole 25 and the bottom 32 of the sleeve 31, and yet another O-ring 39 is located between the outlet port 27 and the protrusion 33 of the sleeve 31. Therefore, hermetic seals are formed between the inner surface of the sleeve 31 and the accommodation hole 23, between the accommodation hole 23 and the insertion hole 25, and between the insertion hole 25 and the outlet port 27.

A communication hole 44 is formed in the bottom 32 of the sleeve 31 to connect the interior of the sleeve 31 to the insertion hole 25, which communicates with the inlet port 26. Also, a communication hole 45 is formed in the protrusion 33 of the sleeve 31. The communication hole 45 extends along the axial direction of the sleeve 31 and through the protrusion 33 and the bottom 32 to connect the interior of the sleeve 31 to the outlet port 27. Accordingly, the inlet port 26 communicates with the outlet port 27 via the interior of the sleeve 31.

An electromagnetic coil 50 is located at a position radially outside of the sleeve 31. A plunger 51 is located inside the sleeve 31. The plunger 51 moves axially within the sleeve 31 based on the magnetomotive force of the electromagnetic coil 50. In the electromagnetic valve 20, the high-pressure gas passage 21 from the inlet port 26 to the outlet port 27 via the interior of the sleeve 31 is opened or closed based on the axial movement of the plunger 51.

The electromagnetic coil 50 is wound about a bobbin-like insulator 52 and accommodated in the accommodation hole 23 together with yokes 53, 54, 55, which form magnetic paths. The sleeve 31 is fitted into the valve body 22 by being inserted into the insulator 52, about which the electromagnetic coil 50 is wound.

The plunger 51 is substantially columnar and makes sliding contact with the inner circumferential surface of the sleeve 31. A coil spring 56 is located between the plunger 51 and the stopper 36. The accommodation hole 23 is closed by a lid 58. The stopper 36 has a main body 57 that contacts the lid 58. The lid 58 restricts the stopper 36 from moving away from the sleeve 31 (rightward as viewed in FIG. 3) in the axial direction of the sleeve 31. That is, relative movement between the stopper 36, which serves as a plug, and the sleeve 31, which serves as a cylinder, is restricted by the lid 58, which serves as a restricting member. The lid 58 is fastened to one end 22a of the valve body 22 by bolts (not shown). The plunger 51 is urged toward the bottom 32 of the sleeve 31 (leftward as viewed in FIG. 3) by the coil spring 56.

A main valve seat 61, which faces the plunger 51, is located on the bottom 32 of the sleeve 31. The main valve seat 61 has a through hole 60 continuous with the communication hole 45, which is formed in the bottom 32 and the protrusion 33 of the sleeve 31. The plunger 51 has a main valve body 62. As the plunger 51 moves along the axial direction, the main valve body 62 contacts the main valve seat 61 to close the through hole 60 of the main valve seat 61.

Figure 4:
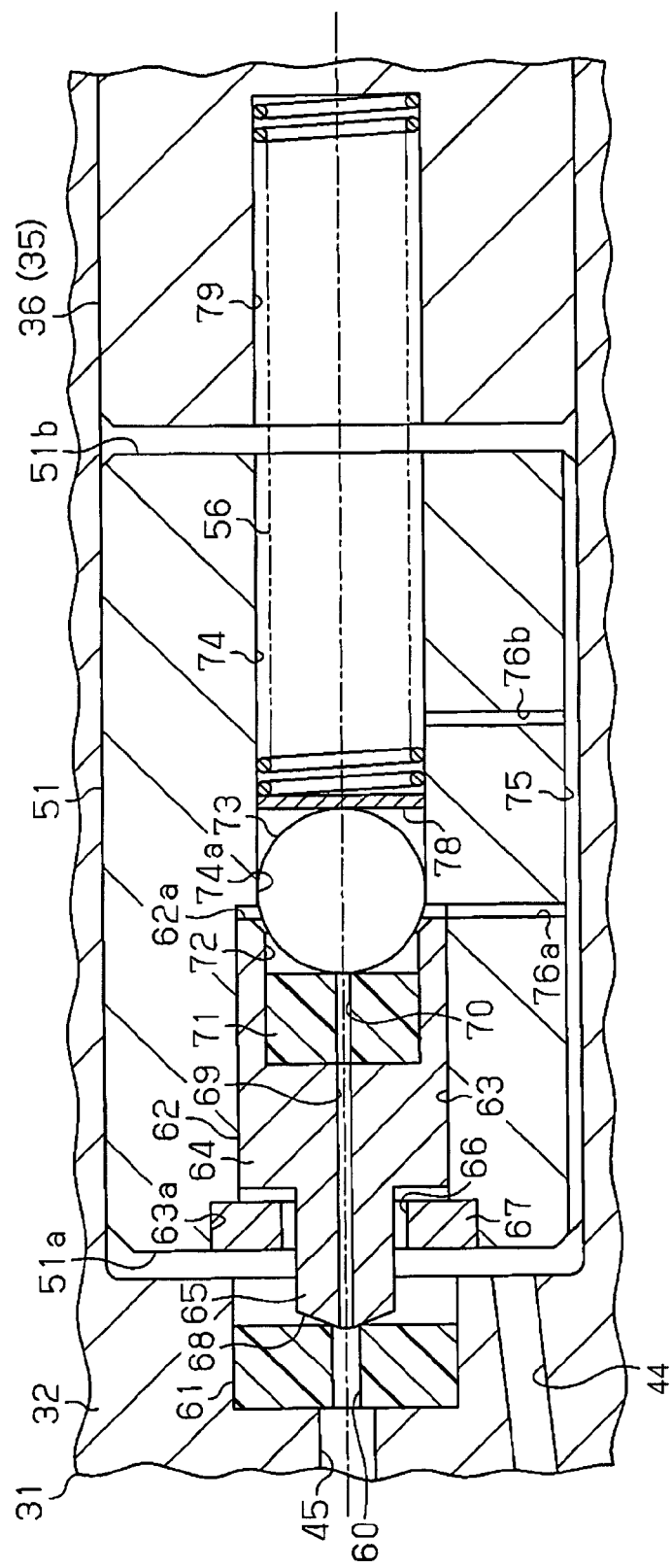
FIG. 4 is an enlarged cross-sectional view illustrating the electromagnetic valve shown in FIG. 3.

As shown in FIG. 4, the plunger 51 has an accommodation hole 63, which opens in an end face 51a (left end face as viewed in FIG. 4) of the plunger 51 that faces the main valve seat 61. The main valve body 62 has a base 64 accommodated in the accommodation hole 63 and a substantially columnar valve main body 65, which protrudes from the base 64 toward the main valve seat 61 (leftward as viewed in FIG. 4). The distal end of the valve main body 65 is located outside the accommodation hole 63.

A restriction plate 67 is fixed in an opening 63a of the accommodation hole 63. A through hole 66 is formed in the restriction plate 67. The through hole 66 is located at a position that corresponds to the through hole 60 of the main valve seat 61. The outer diameter of the base 64 of the main valve body 62 is larger than the diameter of the through hole 66 of the restriction plate 67.

The distal end of the valve main body 65, which protrudes out of the accommodation hole 63 via the through hole 66 of the restriction plate 67, is located closer to the main valve seat 61 than to the end face 51a of the plunger 51. A substantially conical tapered portion 68 is formed at the distal end of the valve main body 65. In the main valve body 62 of the present embodiment, the tapered portion 68 coaxially contacts the through hole 60 of the main valve seat 61 and closes the through hole 60 with a hermetic seal.

A pilot line 69 is formed in the main valve body 62. The pilot line 69 extends axially through the main valve body 62 (lateral direction as viewed in FIG. 4) and opens at the vertex of the tapered portion 68. A pilot valve seat 71 is located at an end 62a of the main valve body 62 at the opposite side to the protrusion 33 of the sleeve 31. The pilot valve seat 71 has a through hole 70 continuous with the pilot line 69. In this embodiment, the pilot valve seat 71 is fixed in a recess 72 formed in the end 62a of the main valve body 62. The diameter of the through hole 70 of the pilot valve seat 71 is smaller than the diameter of the through hole 60 of the main valve seat 61. The electromagnetic valve 20 of the present embodiment is a pilot type electromagnetic valve having a pilot valve body 73, which contacts and separates from the pilot valve seat 71 as the plunger 51 moves.

The outer diameter of the base 64 of the main valve body 62 is substantially equal to the diameter of the accommodation hole 63 of the plunger 51. The length of the base 64 along the axial direction is shorter than the length of the accommodation hole 63 along the axial direction. Therefore, the base 64 of the main valve body 62 is allowed to slide along the axial direction in the accommodation hole 63 of the plunger 51. A through hole 74 extends through the plunger 51 in the axial direction. The through hole 74 extends from an end face 51b of the plunger 51, which faces the stopper 36 and is located opposite to the end face 51a, and communicates with the accommodation hole 63. The pilot valve body 73 is located in a part 74a of the through hole 74 that is adjacent to the accommodation hole 63, to face the pilot valve seat 71. The pilot valve body 73 moves integrally with the plunger 51 in the axial direction. An introduction groove 75, which extends in the axial direction of the plunger 51, is formed in on the outer circumferential surface of the plunger 51. The introduction groove 75 communicates with the accommodation hole 63 and the through hole 74 of the plunger 51 via an introduction passage 76a and an introduction passage 76b formed in the plunger 51.

The pilot valve body 73 is substantially spherical and press fitted in the through hole 74 of the plunger 51 to be fixed in the part 74a of the through hole 74 adjacent to the accommodation hole 63. A pressing plate 78 is fixed in the through hole 74. One end of the coil spring 56 contacts the pressing plate 78. Accordingly, the coil spring 56 is compressed between the pressing plate 78 and the bottom surface of an accommodation hole 79 formed in the insertion portion 35 of the stopper 36, and urges the plunger 51 toward the bottom 32 of the sleeve 31.

When the electromagnetic coil 50 is not energized, the plunger 51 is moved in the axial direction toward the bottom 32 of the sleeve 31 in the sleeve 31 (leftward as viewed in FIG. 3) based on the urging of the coil spring 56. At this time, the pilot valve body 73 is seated on the pilot valve seat 71 and presses the pilot valve seat 71 while closing the through hole 70, which is continuous with the pilot line 69. Accordingly, the main valve body 62 is moved in the axial direction toward the bottom 32 of the sleeve 31 together with the plunger 51 and is seated on the main valve seat 61 on the bottom 32. When the tapered portion 68 of the valve main body 65 closes the through hole 60 of the main valve seat 61, which is continuous with the outlet port 27, the high-pressure gas passage 21 is closed.

On the other hand, when the electromagnetic coil 50 is energized, the magnetomotive force of the electromagnetic coil 50 moves the plunger 51, against the urging force of the coil spring 56, toward the open end 34 of the sleeve 31, or in other words, toward the stopper 36 (rightward as viewed in FIG. 3). At this time, the pilot valve body 73 first separates from the pilot valve seat 71. Thereafter, the restriction plate 67 located in the opening 63a of the accommodation hole 63 contacts the base 64 of the main valve body 62, so that the main valve body 62 is moved in the axial direction toward the open end 34 of the sleeve 31, together with the plunger 51. As a result, the main valve body 62 separates from the main valve seat 61, so that the high-pressure gas passage 21 is open.

Since the through hole 70 of the pilot valve seat 71, which is closed by the pilot valve body 73, has a small diameter, the force required to separate the pilot valve body 73 from the pilot valve seat 71 is relatively small. Also, when the pilot valve body 73 separates from the pilot valve seat 71, hydrogen gas flows to the outlet port 27 via the pilot line 69, which reduces the pressure difference between the outlet port 27 and the interior of the sleeve 31. Accordingly, the force required to separate the main valve body 62 from the main valve seat 61 is reduced. Therefore, the pilot type electromagnetic valve 20 of the present embodiment requires relatively small number of turns of the electromagnetic coil 50, which is a drive source, which permits the electromagnetic valve 20 to be relatively small.

Excessive Pressure Prevention Structure

Next, an excessive pressure prevention structure of the electromagnetic valve 20 will be described. Specifically, description will be given on how the electromagnetic valve 20 functions as a safety valve that prevents gas pressure from increasing beyond an acceptable level.

In the electromagnetic valve 20, a gap for allowing deformation of the sleeve 31 is formed between the sleeve 31 and the insulator 52 as shown in FIG. 3. Therefore, the sleeve 31 is allowed to deform such that the open end 34 is widened outward in the radial direction of the sleeve 31 as a function of the gas pressure in the sleeve 31.

Figure 5:
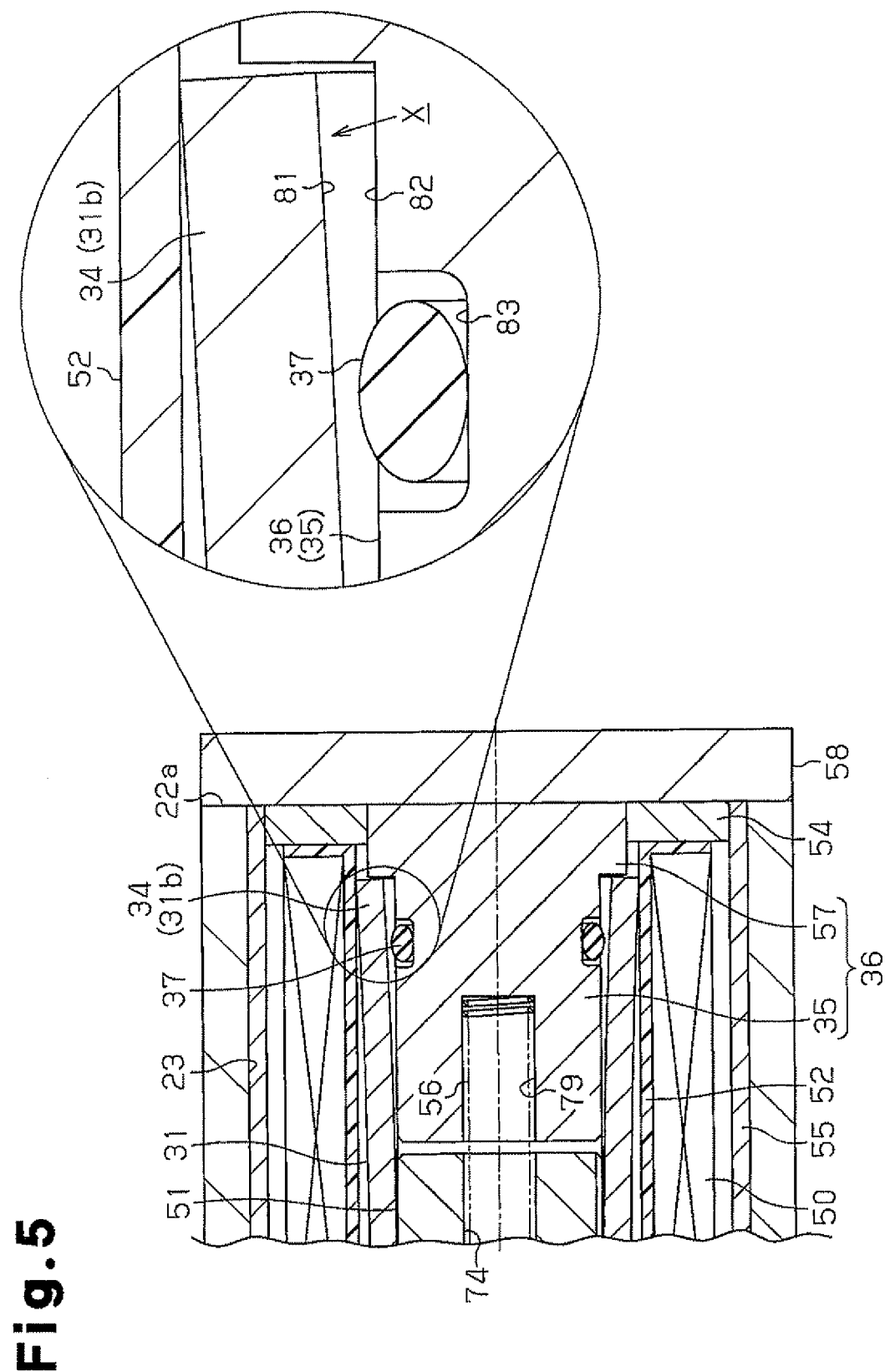
FIG. 5 is an operational diagram in which the electromagnetic valve shown in FIG. 3 functions as a safety valve.

As shown in FIG. 5, the O-ring 37 is fitted in an annular groove 83 formed in an outer circumferential surface 82 of the insertion portion 35 of the stopper 36. The O-ring 37 in the annular groove 83 contacts and is compressed by a part of the inner circumferential surface 81 of the open end 34 of the sleeve 31 that faces the annular groove 83, to form a hermetic seal between the inner circumferential surface 81 of the open end 34 and the stopper 36. That is, the open end 34 of the sleeve 31 is closed with a hermetic seal by the stopper 36.

When the open end 34 of the sleeve 31 is widened due to an increase in the gas pressure and a wide gap X is created between the inner circumferential surface 81 of the open end 34 and the insertion portion 35 of the stopper 36, the O-ring 37 is restored to its original state from its compressed state, and the hermetic seal formed by the O-ring 37 is broken. As a result, gas escapes from the interior of the sleeve 31 through the gap X, so that the gas pressure in the high-pressure gas passage 21 does not increase beyond the acceptable level.

Although the accommodation hole 23 accommodating the sleeve 31 is closed by the lid 58 fastened to the end 22a of the valve body 22 with bolts, gas that escapes to the accommodation hole 23 from the interior or the sleeve 31 is discharged to the outside of the accommodation hole 23 through the gap between the end 22a of the valve body 22 and the lid 58.

The second embodiment has the following advantages.

By using, as a safety valve, an existing electromagnetic valve in the high-pressure hydrogen gas supply system such as the gas tank for a fuel-cell car, gas pressure is easily and inexpensively prevented from increasing beyond an acceptable level, which improves safety.

When the open end 34 of the sleeve 31 is closed by the stopper 36, the stopper 36 receives a force acting to move the stopper 36 away from the sleeve 31 due to the gas pressure in the sleeve 31 (rightward as viewed in FIG. 4). However, since sleeve 31 is deformed as a function of the gas pressure such that the open end 34 is widened, the force applied to the stopper 36 by the gas pressure is reduced. As a result, the stopper 36 is prevented from moving away from the sleeve 31. This further improves safety.

Since a gap for allowing the sleeve 31 to be deformed is located about the sleeve 31, the open end 34 is allowed to be widened without interference.

The above described embodiments may be modified as follows.

In the second embodiment, the present invention is applied to the electromagnetic valve 20, which is used in the high-pressure hydrogen gas supply system. However, the present invention may be applied to an electromagnetic valve for other types of high-pressure gas.

In the second embodiment, the present invention is applied to the pilot type electromagnetic valve 20, which includes the pilot valve body 73 and the main valve body 62 for opening and closing a high-pressure gas passage. However, the present invention may be applied to a structure that directly drives a valve body that corresponds to the main valve body 62.

In the second embodiment, a gap for allowing deformation of the sleeve 31 is formed between the sleeve 31 and the insulator 52. However, the gap between the sleeve 31 and the insulator 52 does not need to allow the entire sleeve 31 to be deformed as long as the open end 34 of the sleeve 31 can be widened.

Figure 6:
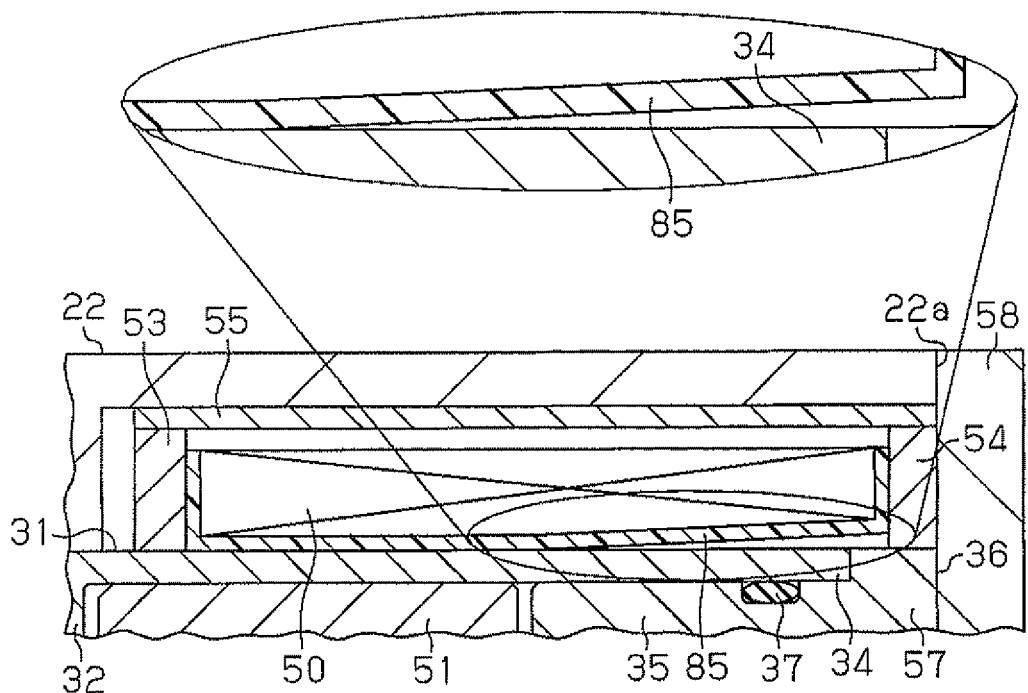
FIG. 6 is a cross-sectional view illustrating an electromagnetic valve according to a modified embodiment of the present invention.

Specifically, as shown in FIG. 6, a part of the sleeve 31 close to the bottom 32 (left part as viewed in FIG. 6) may be held in contact with an insulator 85 without a gap. In this case, a part of the insulator 85 close to the open end 34 of the sleeve 31 may be formed to have a gradually increasing inner diameter.

Figure 7:
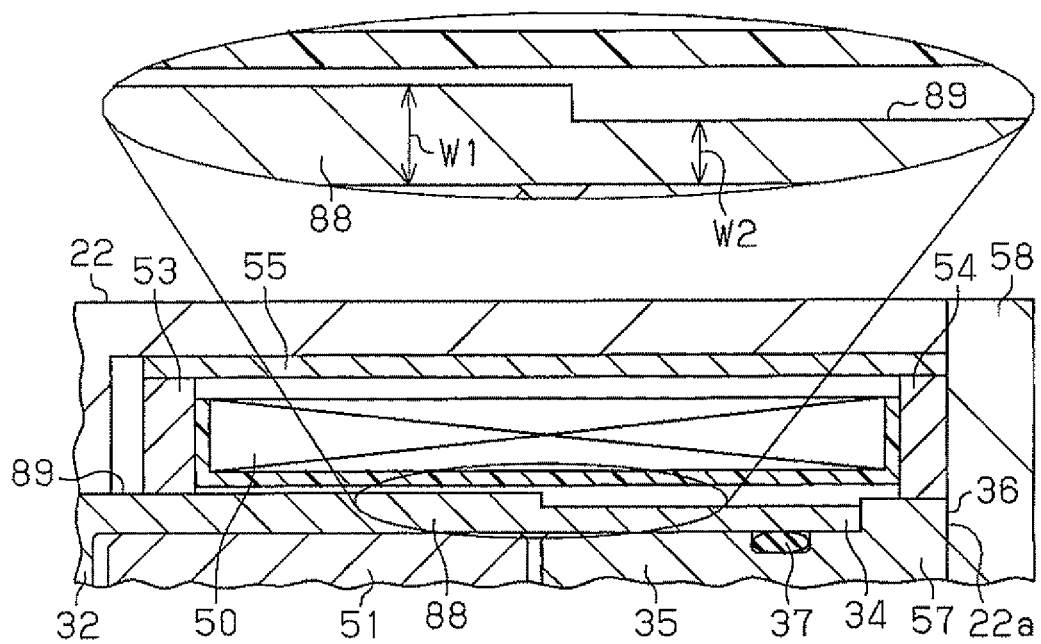
FIG. 7 is a cross-sectional view illustrating an electromagnetic valve according to a modified embodiment of the present invention.

The sleeve may have a high rigidity portion that is harder to deform than the open end. In a case of a sleeve having a certain length, a middle section of the sleeve can be expanded more than the open end by gas pressure. In such a case, the thickness W1 of a part of the sleeve 89 closer to the bottom 32 (left part as viewed in FIG. 7) may be set larger than the thickness W2 of a part of the sleeve 89 closer to the open end 34 (right part as viewed in FIG. 7), so that the part closer to the bottom 32 serves as a high rigidity portion 88. This configuration allows the open end 34 of the sleeve 89 to be preferentially widened, so that the safety valve functions further accurately.

In a case where the sleeve has a high rigidity portion in a part that overlaps the moving range of the plunger 51, deformation of the sleeve that can hinder movement of the plunger 51 is prevented. This prevents the original function of the electromagnetic valve from being degraded.

A high rigidity portion does not need to be provided by making the sleeve have uneven thickness but may be provided by subjecting the sleeve to uneven thermal treatment, for example, by quenching or tempering part of the sleeve. For example, as in the case of a sleeve 31 shown in FIG. 6, the sleeve 31 may be reinforced by making a part of the insulator 85 contact the outer circumference of the sleeve 31, so that the sleeve 31 has a high rigidity portion. The position of a part of the sleeve where a high rigidity portion is formed may be a part that is possibly expanded unnecessarily by gas pressure and may be a middle portion of the sleeve.

Figure 8:
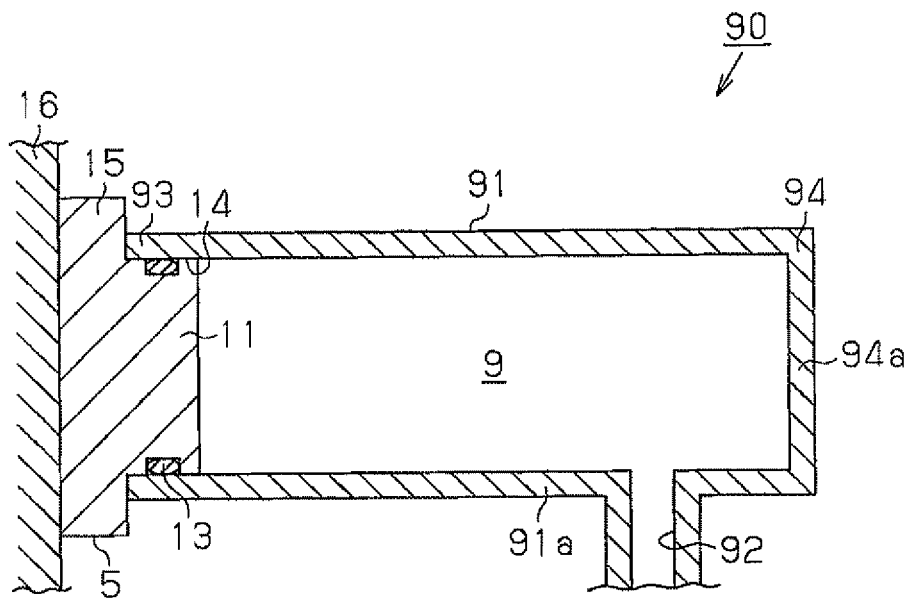
FIG. 8 is a cross-sectional view illustrating a safety valve according to a modified embodiment of the present invention.

In the safety valve 1 of the first embodiment, the connection end 6 of the cylinder 4, which is an axial end opposite to the open end 3, faces the high-pressure gas passage 2. However, as in the case of a safety valve 90 shown in FIG. 8, a communication passage 92 may be formed in a side wall 91a of a cylinder 91 to communicate with a high-pressure gas passage (not shown). An axial end of the cylinder 91 that is opposite to the open end 93 may serve as a closed end 94 that is closed by a bottom 94a.

Figure 9:
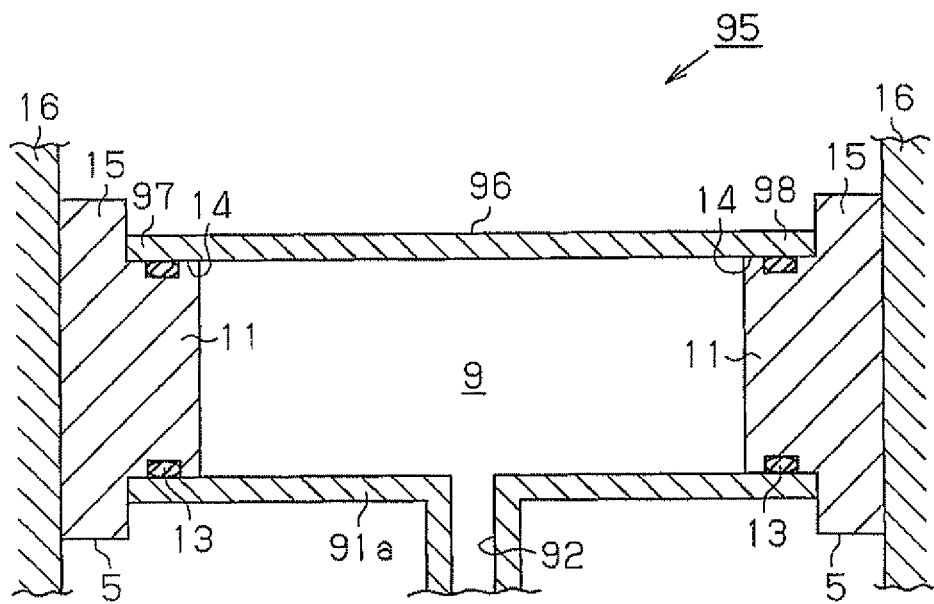
FIG. 9 is a cross-sectional view illustrating a safety valve according to a modified embodiment of the present invention.

As in the case of a safety valve 95 shown in FIG. 9, both axial ends of a cylinder 96 may serve as open ends 97, 98. In this case, the gas pressure in the cylinder 96 is controlled with high accuracy.

Figure 10:
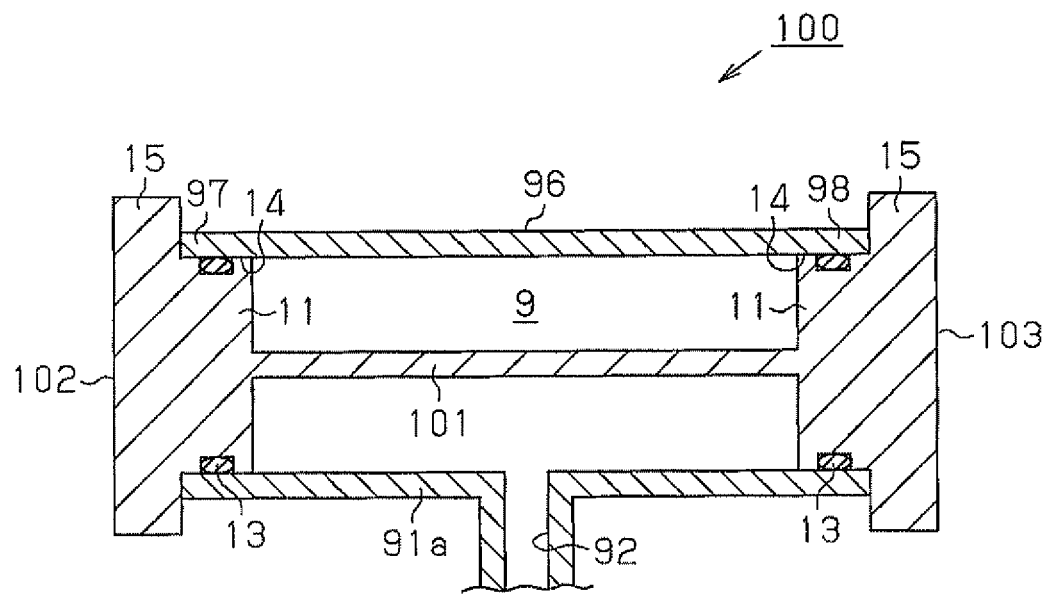
FIG. 10 is a cross-sectional view illustrating a safety valve according to a modified embodiment of the present invention.

As in the case of a safety valve 100 shown in FIG. 10, a coupling shaft 101 may be provided to extend through the interior 9 of a cylinder 96. The coupling shaft 101 integrally couples plugs 102 and 103 closing open ends 97 and 98 to each other. In this case, gas pressure acting on one of the plugs 102, 103 prevents the other from moving. Accordingly, no component like the restricting member 16 used in the safety valve 1 shown in FIG. 1 is needed.

Figure 11:
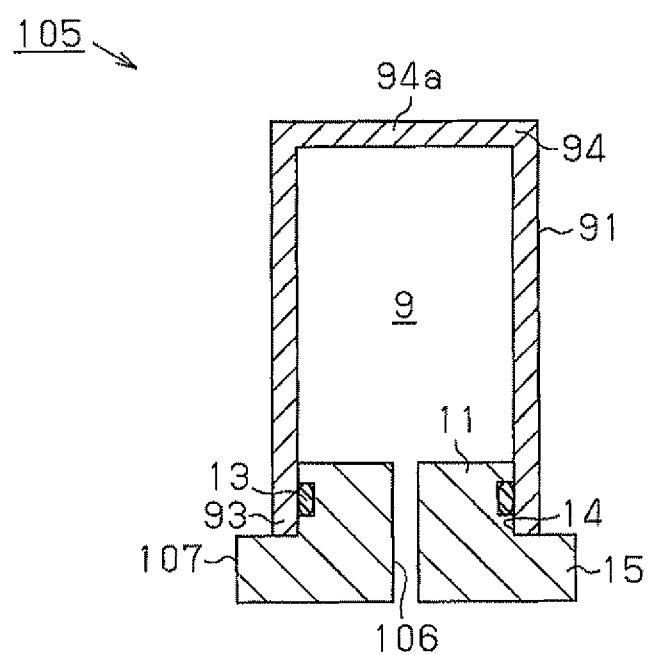
FIG. 11 is a cross-sectional view illustrating a safety valve according to a modified embodiment of the present invention.

As in the case of a safety valve 105 shown in FIG. 11, an axial end of a cylinder 91 that is opposite to an open end 93 may serve as a closed end 94 that is closed by a bottom 94a. The bottom 94a is integrally formed with the cylinder 91. Also, a communication passage 106 may be formed in a plug 107, which closes the open end 93. The communication passage 106 communicates with a high-pressure gas passage (not shown).

The invention claimed is:

1. An electromagnetic valve comprising:
a cylindrical sleeve that is located in a high-pressure gas passage and has an open end;
a plug that closes the open end of the sleeve with a hermetic seal;
an electromagnetic coil located at a position radially outside of the sleeve;
a plunger that moves within the sleeve based on magnetomotive force of the electromagnetic coil; and
a valve body that opens and closes the high-pressure gas passage based on movement of the plunger,
wherein the electromagnetic valve functions as a safety valve in which the sleeve is deformed as a function of gas pressure in the high-pressure gas passage to widen the open end, such that gas in the high-pressure gas passage escapes and the gas pressure is prevented from increasing beyond an acceptable level.

2. The electromagnetic valve according to claim 1, wherein the sleeve has a high rigidity portion that is harder to deform than the open end.

3. The electromagnetic valve according to claim 1, further comprising a sealing member located between the plug and the open end, wherein the sealing member is compressed between the plug and the open end to form the hermetic seal between the plug and the open end.

4. The electromagnetic valve according to claim 1, wherein a gap is formed at a position radially outside of the sleeve to permit the open end of the sleeve to be widened.

* * * * *